Dec. 23, 1952  D. L. GREENE ET AL  2,623,089

GROUNDING SYSTEM

Original Filed Dec. 22, 1947

INVENTORS
CARROLL A. BADEAU
DONALD L. GREENE

BY

Warren S. Orton

ATTORNEY

Patented Dec. 23, 1952

2,623,089

UNITED STATES PATENT OFFICE 2,623,089

GROUNDING SYSTEM

Donald L. Greene, Reading, Pa., and Carroll A. Badeau, Westfield, N. J., assignors to The Thomas & Betts Co., Elizabeth, N. J., a corporation of New Jersey Original application December 22, 1947, Serial No. 793,198. Divided and this application September 3, 1948, Serial No. 47,644

2 Claims. (Cl. 174—6)

The invention relates to an improvement in electric systems for grounding lightning and other momentarily high charges of electricity which may impinge on a building and also for grounding one or more electric devices which may be removably contained within the building, and constitutes a division of our copending application entitled Bus Bar Connectors, Serial No. 793,198, filed December 22, 1947, now Patent No. 2,574,781, issued November 13, 1951.

In the parent application there is featured a system of conductors fabricated mainly from lengths of heavy copper bus bars tied together at their jointures by block-like connectors in which the end of the bus bars were inserted and which bus bars are screwed or clamped in place. The assembly was anchored to a building wall, ceiling or other support by means of mounting clips or brackets.

The grounding system herein disclosed is particularly designed to provide an improved grounding grid for effectively grounding the building columns and associated metal framework and features the providing of a good bond between the grid and the building steel organized to carry off any short circuit currents from the building steel.

In order to contribute to this objective, it is herein suggested as preferred practice that the clip or bracket which supports the grid be welded directly to a girder upright or other metal element of the framework to form an integral and permanent part of the building framework.

Various other objects and advantages of the invention will be in part obvious from an inspection of the accompanying drawings and in part will be more fully set forth in the following particular description of a means for practicing the invention.

Figure 1:
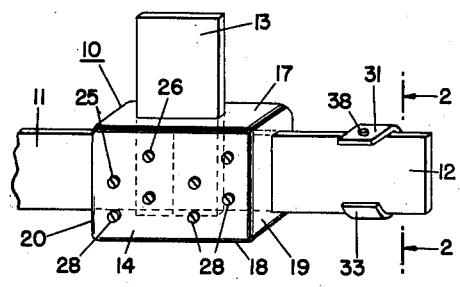
Figure 3:
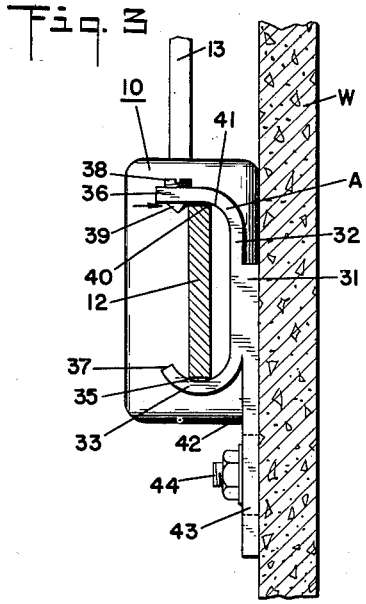
Figure 2:
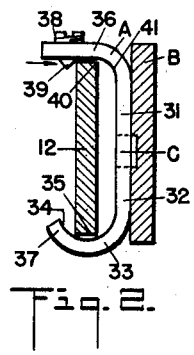

In the accompanying drawing:

Fig. 1 is a view in elevation of a corner of a grounding system shown in position ready to be mounted on a supporting wall; showing the juncture of three bus bars forming a T and showing a supporting bracket for one of the bars constituting an embodiment of the mounting clip or bracket aspect of the invention;

Fig. 2 is a view in side elevation of the clip shown in Fig. 1 as viewed from the plane indicated by the line 2—2 of Fig. 1, omitting the connector and showing a preferred means for securing the clip to a support; and Fig. 3 is a view of the assembly as viewed from the plane 2—2 of Fig. 1, with a third form of bracket substituted for the form shown in Figs. 1 and 2.

The grounding system herein disclosed is formed solely of three stock parts, bus bars, block-like clamping connectors and wall brackets or clips for supporting the bus bars and thus the fabricated system considered as a unit from a supporting wall.

Referring first to the assembly as shown in Figs. 1 and 2, there is disclosed the adjacent ends of three bus bars inserted into a common one-piece block-like connector 10. Two of the bars 11 and 12 are disposed in horizontal alignment, in end-to-end abutting relation and the third upstanding bar 13 back-laps the abutting ends of the bars 11 and 12 in positive electric and in firm mechanical bearing engagement therewith.

The connector 10 is formed of a solid one-piece block of bronze cast to shape and subsequently machined to finished form. The connector is of rectangular form substantially a regular parallelepiped, with rounded corners and with opposing flat faces forming a front or top face 14 and a rear or bottom face. The rear face is intended to abut the supporting wall and to space the bus bars therefrom as shown in Figs. 2 and 3. The connector is outlined by four narrow edge walls forming a pair of opposing long walls 17 and 18 and a pair of relatively shorter opposing end walls 19 and 20.

The initial solid cast block from which the connector is formed is machined internally between the parallel flat faces to form a pair of intersecting flat passageways or sockets each dimensioned to receive the bus bars with a substantially snug but freely sliding fit.

The top face 14 is provided with a plurality of threaded screw holes extending therethrough in the portions thereof overlapping the two passageways.

Each screw hole, or at least those which are to be used, is provided with a screw 28 threaded therein.

It is a feature of this disclosure that the connectors are not directly supported from any of the walls W, or from the building framework. In addition to functioning as binding means between the bus bars, these connectors also function as spacing means for maintaining the bus bars in spaced relation to the walls which support them. The rear portion of the connector, that is, the material thereof between the rearmost passage and the rear face may be considered as a spacer.

The assembly of connectors and bars is supported from brackets which engage the vertically extending horizontally disposed bus bars and under-lap the same edgewise. Three forms of these brackets, generally designated A, are disclosed, distinguishing between them primarily in the manner of securing them to the wall. All forms of these brackets include a rigid upstanding C-shaped clamp 31 and comprises an upstanding web 32 with forwardly extending flanges spaced apart vertically a distance to accommodate therebetween any one of the bus bars. The lower flange 33 is bent forwardly and upwardly to form a concaved seat 34 designated to receive and support the lower edge 35 of the bus bar. The lower flange 33 terminates at its lower end in an upturned lip 37 designed to restrain any tendency of the edge 35 to move forwardly off the seat 34. The upper flange 36 extends straight outwardly at right angles to the web 32 rounding into the same in a curve of small radius and thus is not provided with any lip such as forms the outer end of seat 34. A wedging screw 38 is threaded through the flange 36 adjacent its free outer edge and is disposed with the axis of its line of thrust outside of the bar, close to and parallel to the outer face of the bar. This screw has its inner end projecting beneath the flange 36 and is in the form of a flat cone 39 of large diameter compared to its axial length and with its inner conical wedging side designed to bear against the upper outer face of the bus bar adjacent its upper edge 40 as the screw is advanced downwardly. In this way and with the bus bar in position as shown in either Fig. 2 or 3, the axial advance of the wedging screw develops an inwardly and laterally directed force component as indicated by the arrow in Figs. 2 and 3, to force the upper edge 40 inwardly against the reentrant curved corner 41 formed by the rounding of web 32 into the flange 36, and thus act to lock the bus bar to the bracket.

Two means are suggested for securing the bar supporting bracket or clip to the building structure. In Figs. 1 and 2 there is shown a metal bar B forming part of the metal framework of a building to which the web 32 is welded by means of a plug weld C integrally bonding the framework to the clip or bracket A. The bar or plate B may be a column, but often is a girder element of the framework and, in this case, is, of course, horizontally disposed. In Fig. 3 there is a flat plate-like extension 42 projecting integrally from the web 32 and provided with a mounting slot 43 through which a screw or bolt 44 is passed. This permits of any necessary vertical adjustment of the bracket and bus bar to relieve mounting strains on the bar should such strains develop during or even after the assembly has been fixed in place on the supporting wall.

It is particularly noted that there are no holes drilled through the bus bars as has been known heretofore in this art and in this way the full conductive capacity of the bus bars is maintained. Even though there is presented a powerfully acting clamping engagement between the bars and connector, neither is distorted from its preformed configuration and, in this way, there is assurance that all parts will interfit when the system is fabricated in situ. It is also noted that the grid-forming bars are firmly connected one with the other and that the grid, considered as a whole, is mounted at a plurality of parts to the metal framework by means of the brackets herein disclosed. In the preferred embodiment of the mounting brackets, as shown in Fig. 2, the brackets are welded to the framework of the building and in this way the copper bus bars are secured directly to the framework of the building at many points.

We claim:

1. In an electric grounding system, the combination of a building structure including a wall having an exposed surface and having therein a reinforcing framework of building steel with an element thereof having a flat face adjacent the exposed wall surface, a pair of upstanding wall brackets of conductive material disposed in horizontal alignment, each bracket having a web portion and a pair of clamping flanges projecting from its web and from the exposed face of the wall, the web portion of at least one of the brackets extending along the flat face of said element to provide a substantial area of metal-to-metal contact between the metal element and the bracket, means at each bracket for permanently securing together the bracket and the framework whereby the brackets become integral parts of the building steel, and a grid system including a bus bar extending across the space between the brackets and demountably secured between the flanges of the brackets.

2. The grounding system defined in claim 1 and wherein the grid system includes a floating connector secured to the bus bar and supported thereby and said connector having a portion thereof located between the bus bar and the exposed surface of the wall to space the bus bar from said wall.

DONALD L. GREENE.
CARROLL A. BADEAU.

REFERENCES CITED

The following references are of record in the file of this patent:

UNITED STATES PATENTS

| Number | Name | Date |
|---|---|---|
| 1,373,716 | Dottl | Apr. 5, 1921 |
| 1,489,104 | Armington | Apr. 1, 1924 |
| 1,593,986 | Poirier | July 27, 1926 |
| 1,943,660 | Edwards | Jan. 16, 1934 |
| 2,167,608 | Cole | July 25, 1939 |
| 2,221,934 | Ferris | Nov. 19, 1940 |
| 2,232,602 | Grace | Feb. 18, 1941 |
| 2,275,203 | Rudd | Mar. 3, 1942 |